US007024624B2

(12) United States Patent
Hintz

(10) Patent No.: US 7,024,624 B2
(45) Date of Patent: Apr. 4, 2006

(54) LEXICON-BASED NEW IDEA DETECTOR

(76) Inventor: Kenneth James Hintz, 11727 Lakewood La., Fairfax Station, VA (US) 22039

( * ) Notice: Subject to any disclaimer, the term of this patent is extended or adjusted under 35 U.S.C. 154(b) by 569 days.

(21) Appl. No.: 10/038,464

(22) Filed: Jan. 7, 2002

(65) Prior Publication Data

US 2003/0131319 A1 Jul. 10, 2003

(51) Int. Cl.
*G06F 3/00* (2006.01)
(52) U.S. Cl. .................. 715/532; 715/530; 715/538
(58) Field of Classification Search ............. 715/500, 715/530, 532, 538; 704/10; 714/10
See application file for complete search history.

(56) References Cited

U.S. PATENT DOCUMENTS

| | | | | |
|---|---|---|---|---|
| 4,670,848 A | * | 6/1987 | Schramm | 706/62 |
| 4,682,365 A | * | 7/1987 | Orita et al. | 382/159 |
| 5,724,571 A | * | 3/1998 | Woods | 707/5 |
| 5,841,895 A | * | 11/1998 | Huffman | 382/155 |
| 5,974,412 A | * | 10/1999 | Hazlehurst et al. | 707/3 |
| 6,167,368 A | * | 12/2000 | Wacholder | 704/9 |
| 6,253,169 B1 | * | 6/2001 | Apte et al. | 704/9 |
| 6,282,538 B1 | * | 8/2001 | Woods | 707/5 |
| 6,289,353 B1 | * | 9/2001 | Hazlehurst et al. | 707/102 |
| 6,493,703 B1 | * | 12/2002 | Knight et al. | 707/3 |
| 6,515,681 B1 | * | 2/2003 | Knight | 707/3 |
| 6,571,234 B1 | * | 5/2003 | Knight et al. | 707/3 |
| 6,594,658 B1 | * | 7/2003 | Woods | 707/5 |
| 6,621,930 B1 | * | 9/2003 | Smadja | 382/224 |
| 6,647,383 B1 | * | 11/2003 | August et al. | 707/3 |
| 6,721,748 B1 | * | 4/2004 | Knight et al. | 707/10 |
| 6,741,985 B1 | * | 5/2004 | Green | 707/5 |
| 6,741,986 B1 | * | 5/2004 | Cho et al. | 707/5 |
| 6,772,160 B1 | * | 8/2004 | Cho et al. | 707/10 |
| 6,778,982 B1 | * | 8/2004 | Knight et al. | 707/3 |
| 6,804,675 B1 | * | 10/2004 | Knight et al. | 707/10 |
| 2002/0049792 A1 | * | 4/2002 | Wilcox et al. | 707/522 |
| 2002/0059204 A1 | * | 5/2002 | Harris | 707/3 |
| 2002/0062243 A1 | * | 5/2002 | Anderson | 705/10 |
| 2002/0103834 A1 | * | 8/2002 | Thompson et al. | 707/526 |

* cited by examiner

*Primary Examiner*—Stephen Hong
*Assistant Examiner*—Gregory J Vaughn

(57) ABSTRACT

A method and apparatus for detecting the occurrence of new ideas in documents or communications. The method is comprised of three processes. The first process lexicalizes all words or symbols in a set of documents. The second process compares all words in a second set of documents to the words in the lexicon. Words not already in the lexicon are presented to a user who takes one of two courses of action, 1) lexicalizes the word, or, 2) declares it a "fad" indicating that the word is to be further analyzed. The third process measures the spatial and temporal spread of said fad by searching a third set of documents and computing metrics based on additional occurrences of said fad, said metrics being used to determine when a fad has achieved a level of interest denoted as a category. When a category is detected, a user is notified.

18 Claims, 8 Drawing Sheets

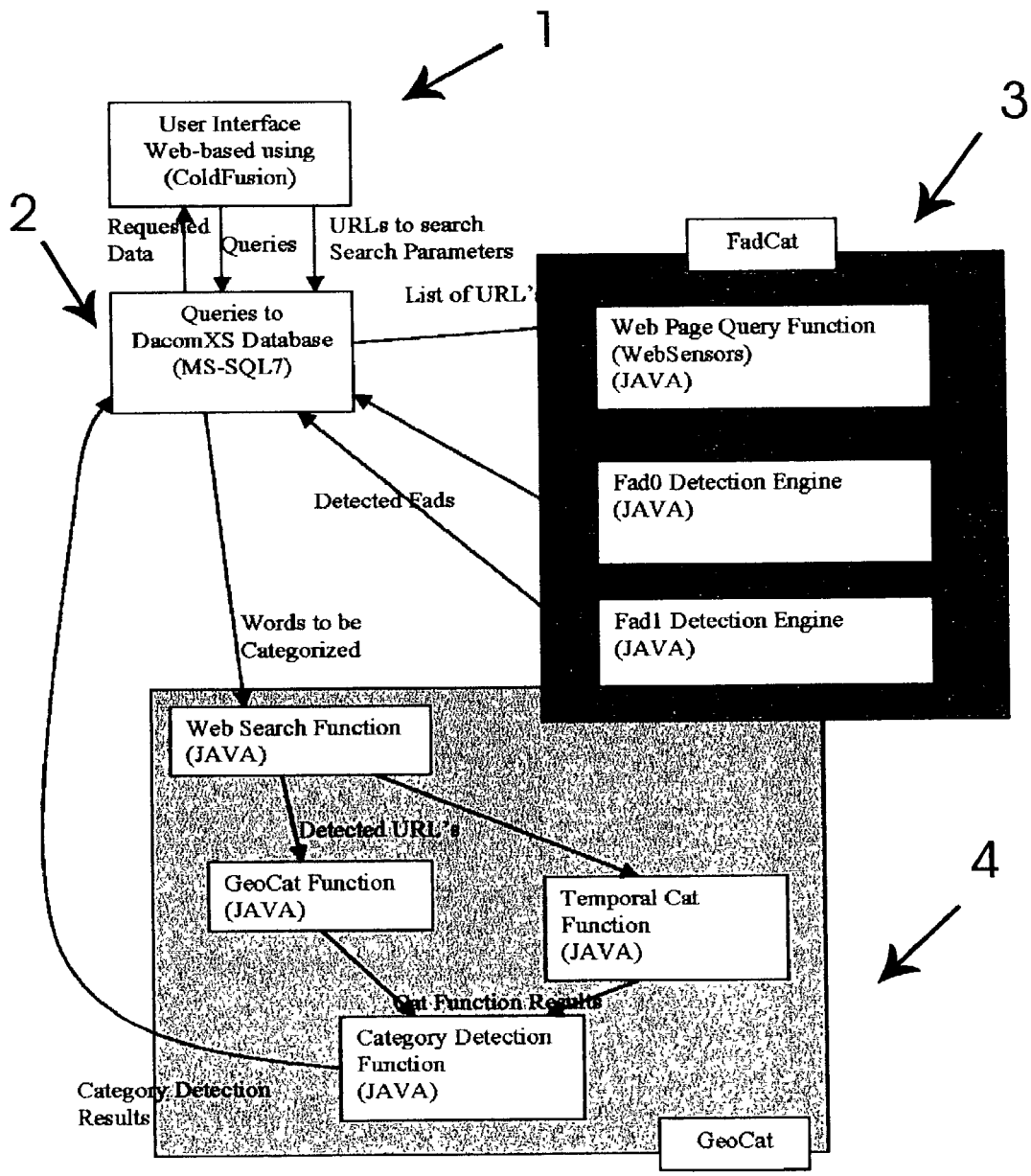
DRAWING 1

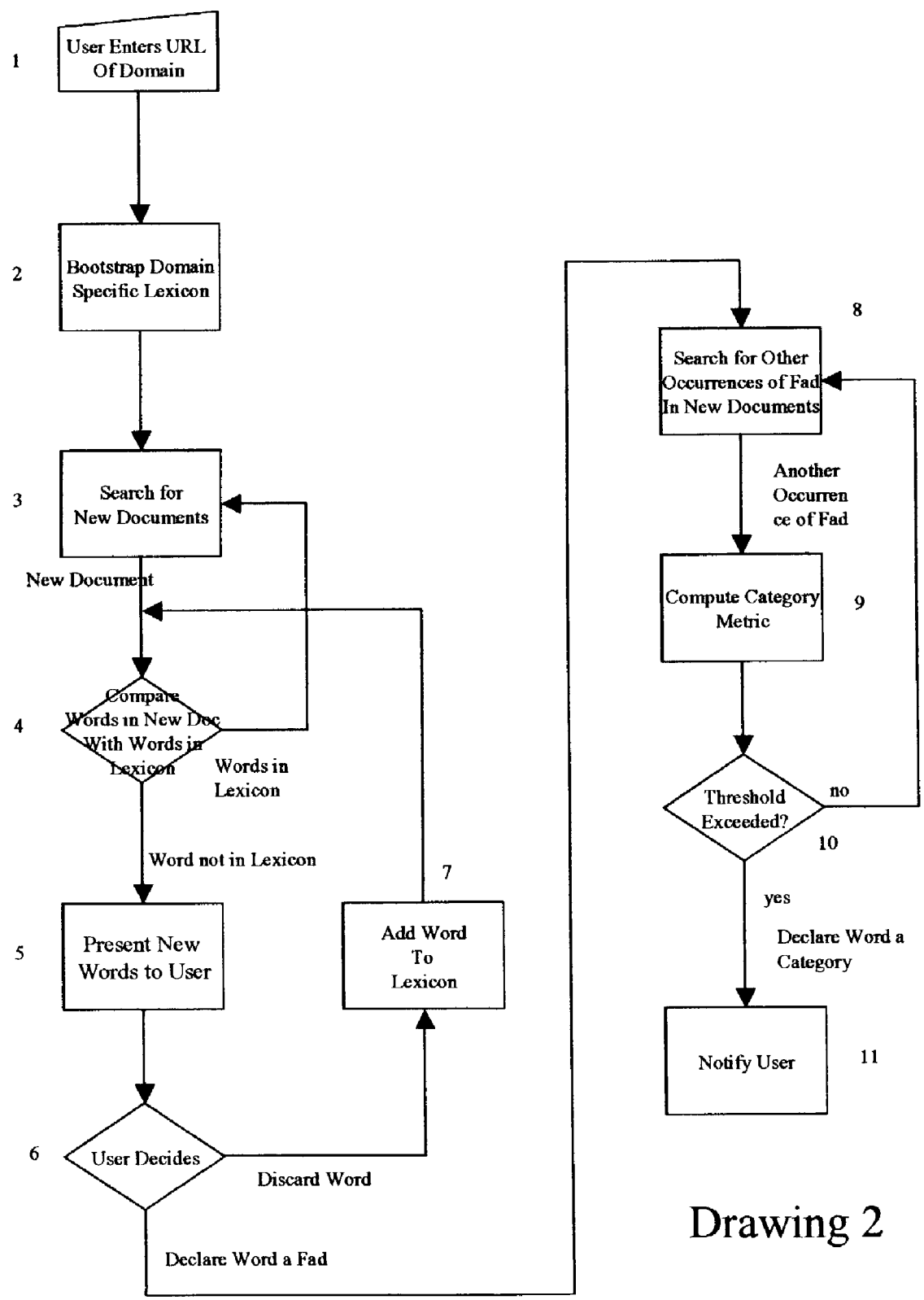
Drawing 2

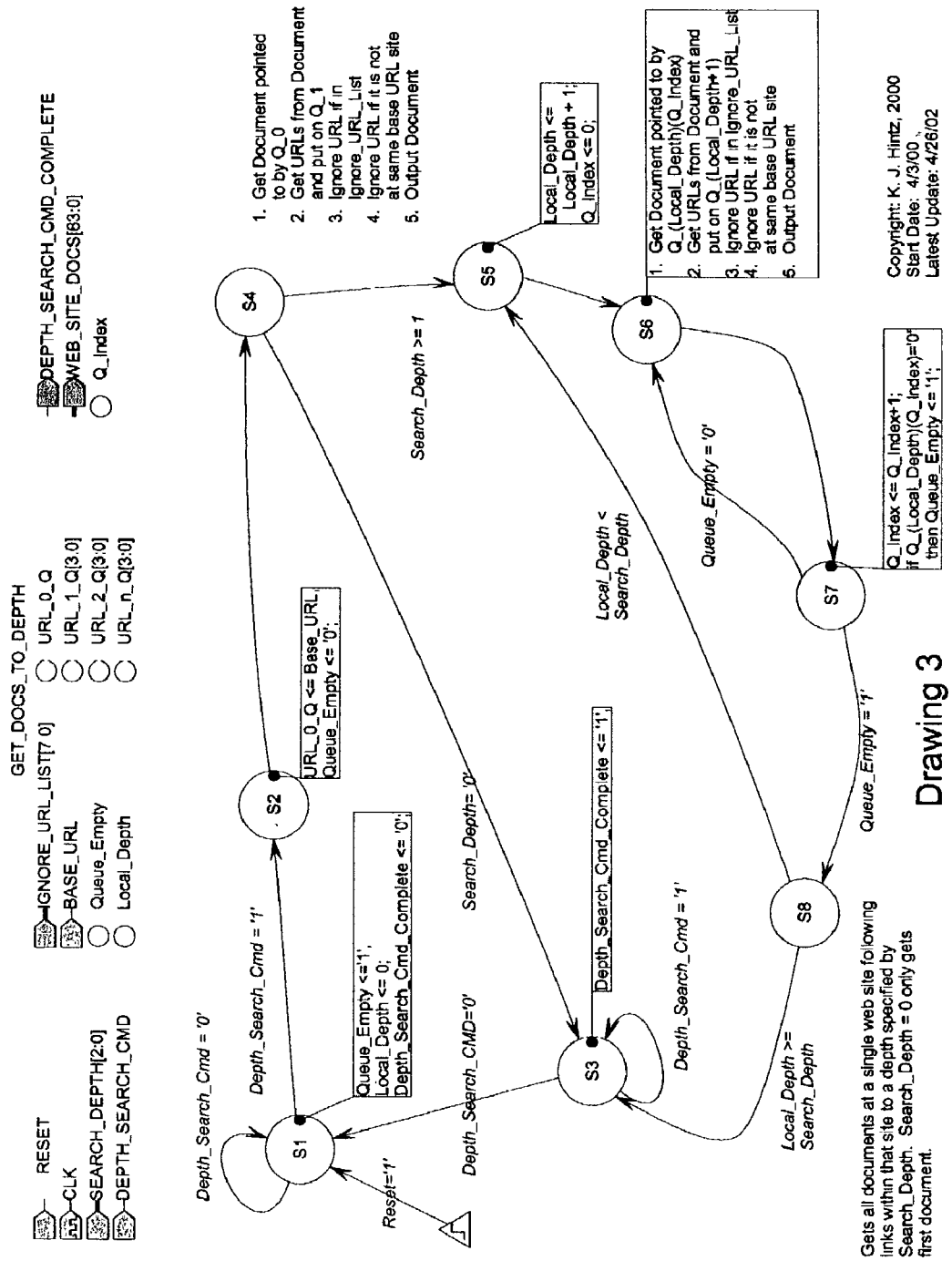

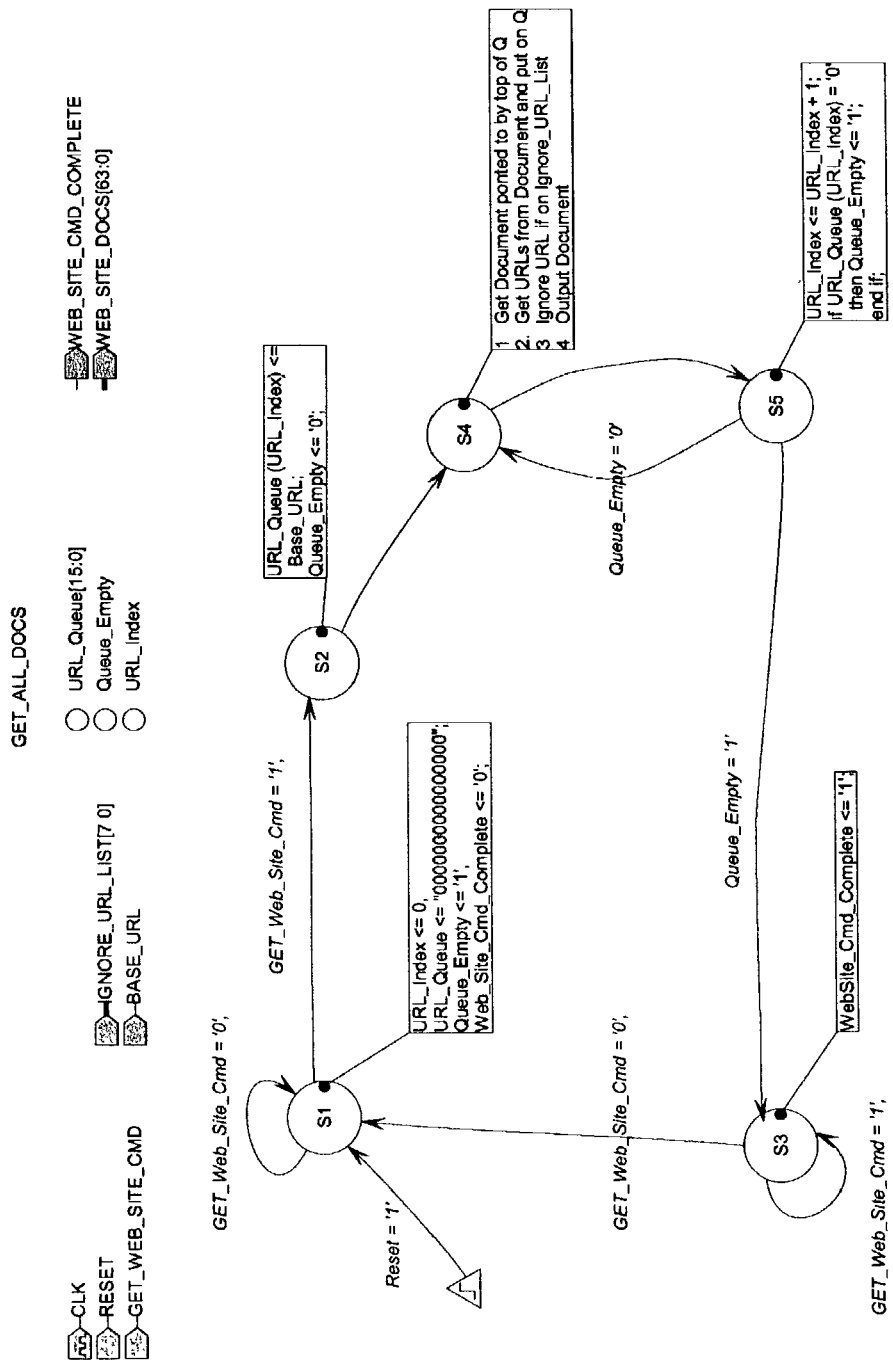

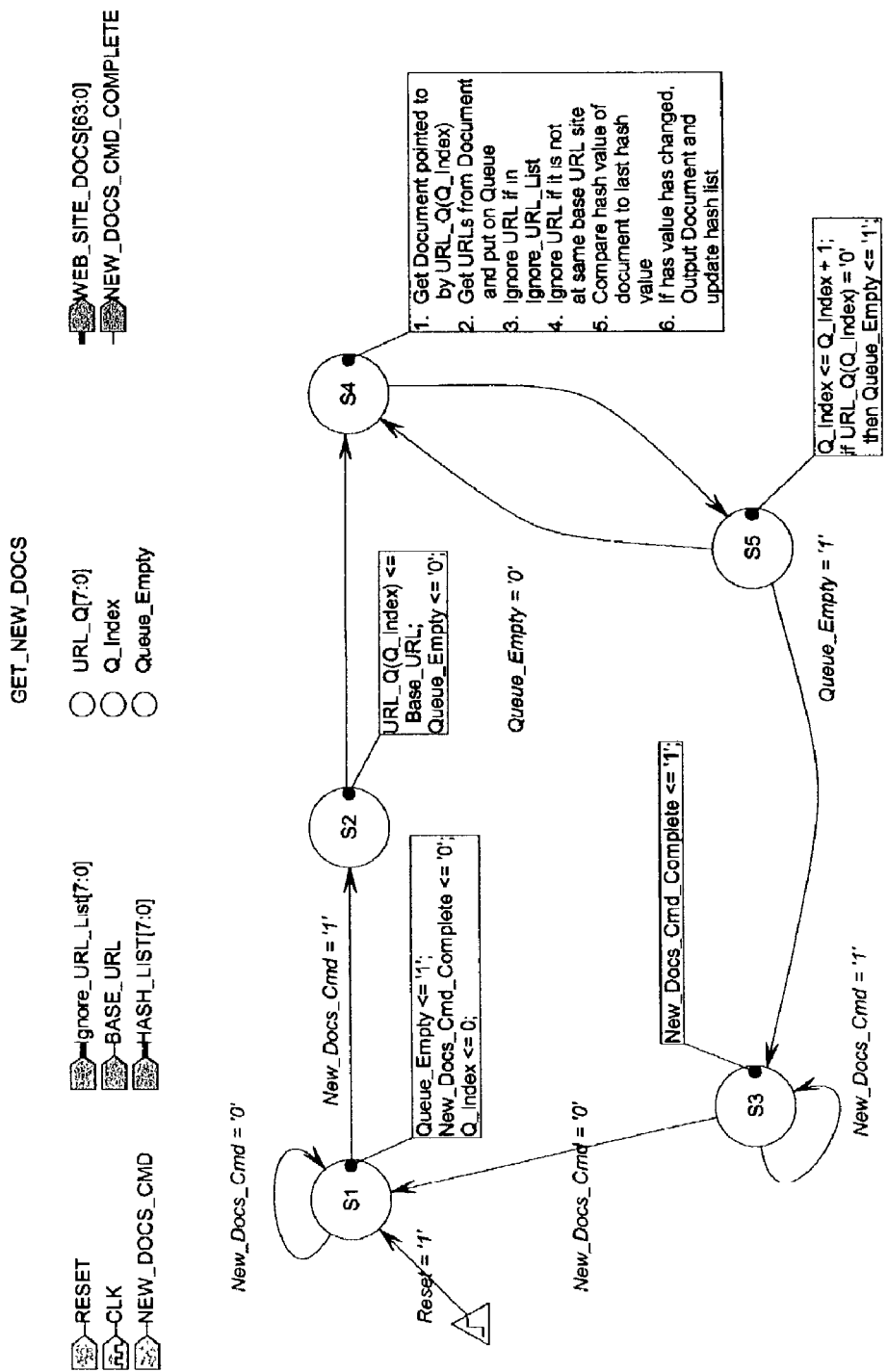
Drawing 5

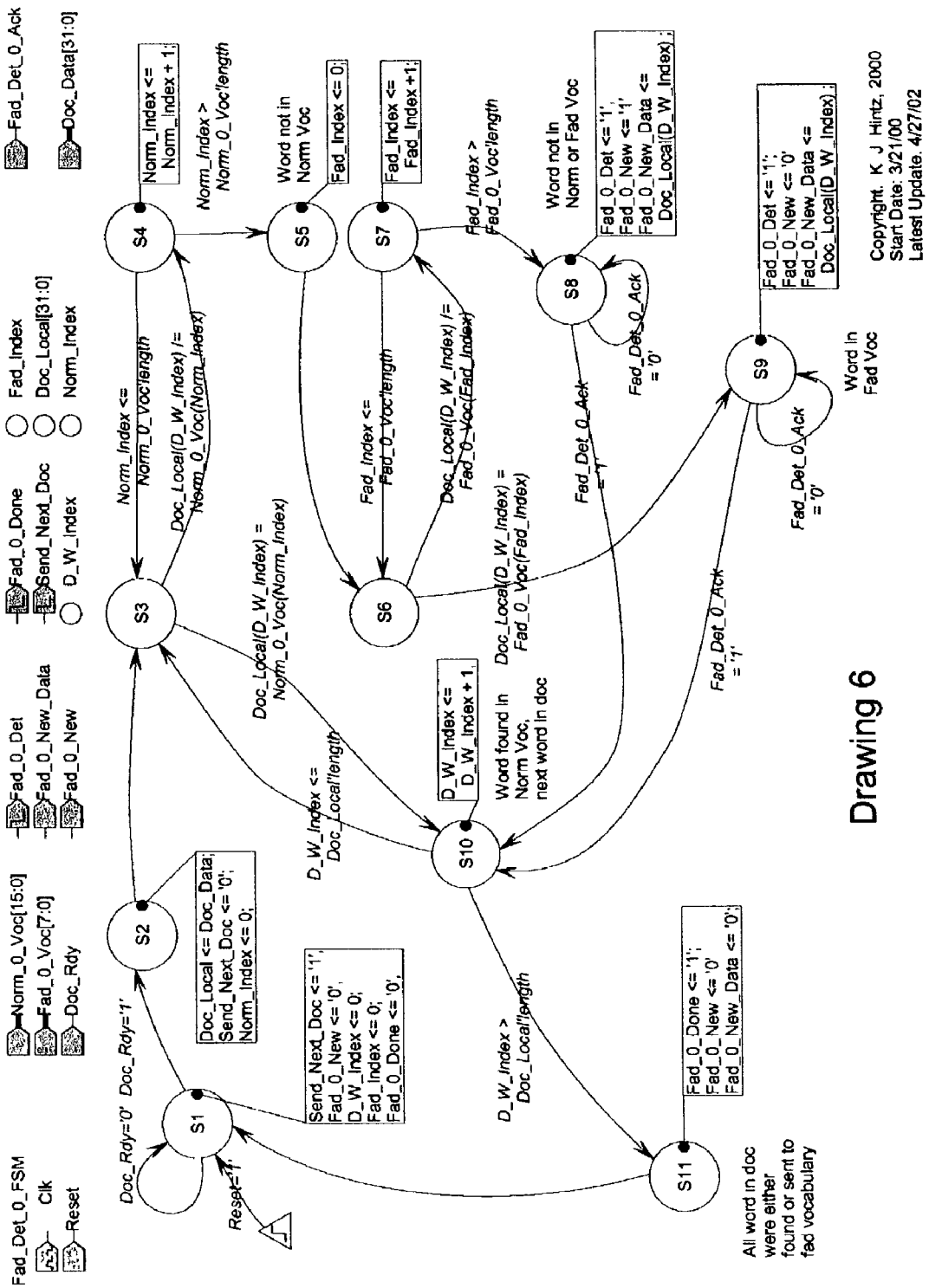
Drawing 6

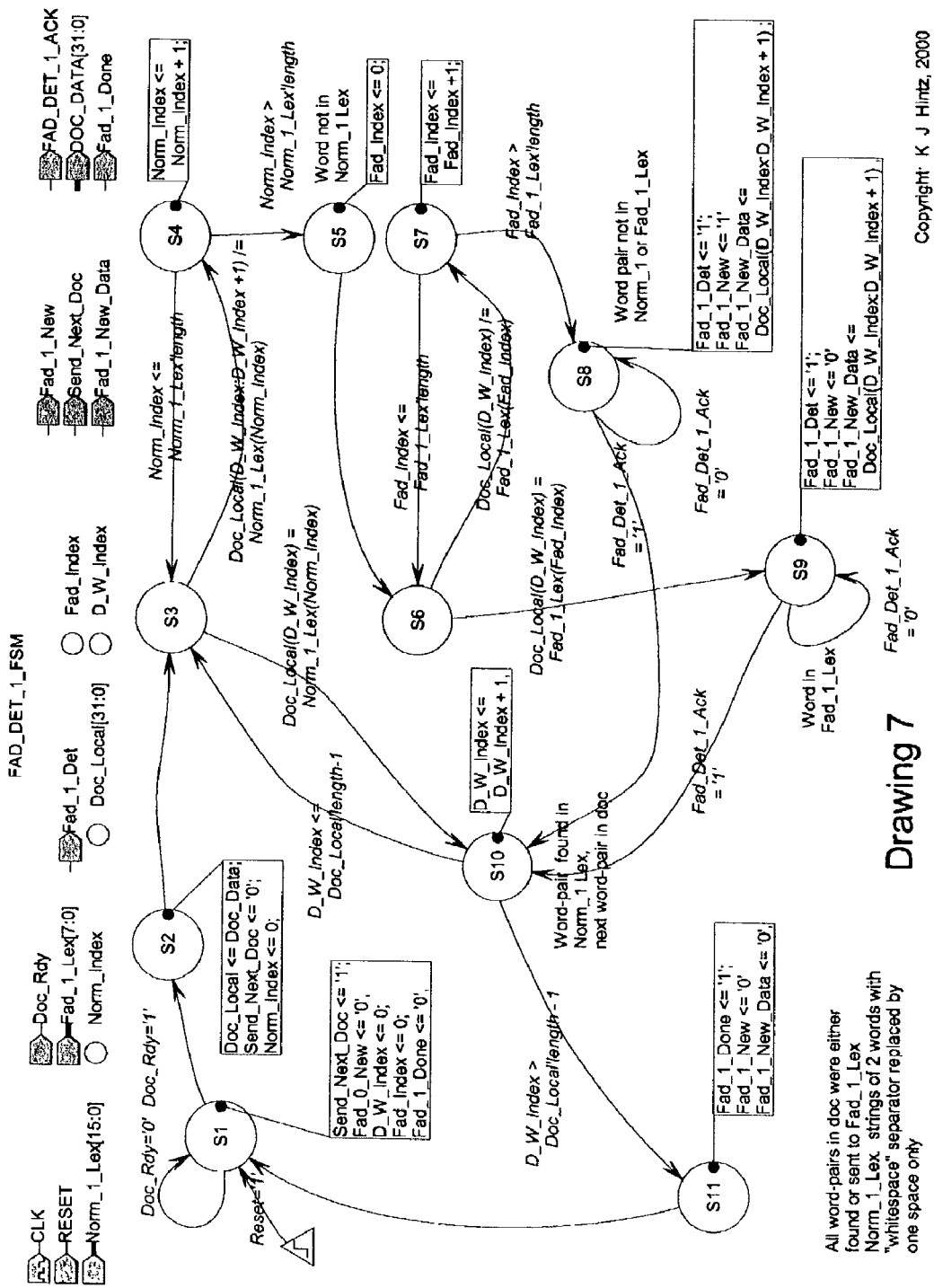
Drawing 7

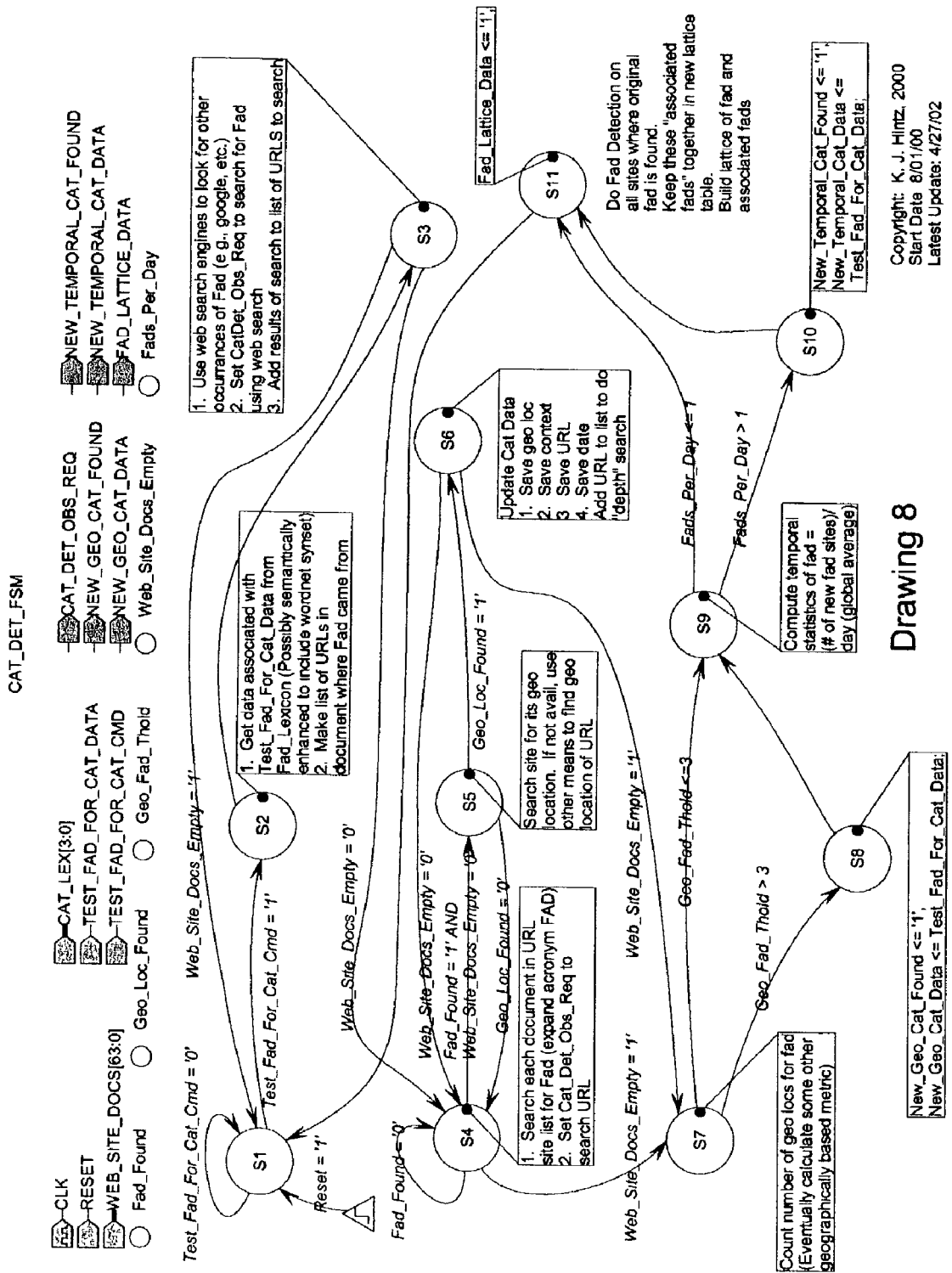

LEXICON-BASED NEW IDEA DETECTOR

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Accompanying this application is a single CDROM which contains program listings which implement a preferred embodiment of the invention. The CDROM has 2 subdirectories, httpd and java, for each of the two programming languages in which it is implemented, CFM (ColdFusion internet application development software computer programming language) and the JAVA computer programming language. The directory structure from the original implementation is retained to allow one skilled in the art to easily implement the code. The specific files in each of the directories are:

```
|--httpd
| |--cfm
| | |--Analysis.cfm
| | |--Category Analysis.cfm
| | |--Category Viewer.cfm
| | |--FadCat.cfm
| | |--Submitted.cfm
| | |--Target.cfm
| | |--dacomxfs.zip
| | |--header.cfm
| | |--images
| | | |--Categorize.jpg
| | | |--Discard.jpg
| | | |--FadCat.jpg
| | | |--Gister.jpg
| | | |--Gister_dis.jpg
| | | |--Home.jpg
| | | |--Next.jpg
| | | |--Next_dis.jpg
| | | |--Prev_dis.jpg
| | | |--Previous.jpg
| | | |--lexiconize.jpg
| | | |--lexiconize_all.jpg
| | | '--tail_swish_lg_wht.gif
| | |--index.cfm
| | |--style.css
| | |--trailer.cfm
| | '--viewer.cfm
| '--html
|     |--dacom_FAQ_1.htm
|     |--oed-category.html
|     |--oed-dictionary.html
|     |--oed-epistemology.html
|     |--oed-fad1.html
|     |--oed-fad2.html
|     |--oed-fad3.html
|     |--oed-glossary1.html
|     |--oed-lexicon.html
|     |--oed-lexiconize.html
|     |--oed-ontology.html
|     |--oed-taxonomy.html
|     |--oed-vocabulary1.html
|     '--oed-vocabulary2.html
|--java
```

-continued

```
| |--usr
| | '--local
| |       '--dacom
| |             |--cat.lex
| |             |--fad.lex
| |             |--fadcat.sh
| |             '--norm.lex
| '--var
|     '--lib
|         '--classes
|             '--com
|                 '--igtech
|                     '--app
|                         '--dacom
|                             |--FadCat.class
|                             |--FadCat.java
|                             |--FadCatAnalysis.class
|                             |--FadCatAnalysis.java
|                             |--FadCatDB.class
|                             |--FadCatDB.java
|                             |--FadDet1.class
|                             |--FadDet1.java
|                             |--HTMLParser.class
|                             |--HTMLParser.java
|                             |--IsFadCat.class
|                             |--IsFadCat.java
|                             |--LevelBasedSearch.class
|                             |--LevelBaseclSearch.java
|                             |--Lexicon.class
|                             |--Lexicon.java
|                             |--SiteSearch.class
|                             |--SiteSearch.java
|                             |--UpdateFadVoc.class
|                             |--UpdateFadVoc.java
|                             |--WebSensors.class
|                             |--WebSensors.java
```

BACKGROUND OF THE INVENTION

The field of this invention relates in general to a semi-automatic method for detecting new ideas in a domain of endeavor or field of study based on the occurrence of a word, symbol, acronym, abbreviation, or nickname which has previously not appeared in the lexicon of words associated with that domain. It also relates to internet web and generic text or symbolic search methods.

The original motivation for this invention is the difficulty which businesses have in detecting new ideas while they are still fresh and exploitable in the sense of creating opportunities to capture an emerging market while it is still growing and before it has become saturated with competitors. Although there are significant amounts of data in the media, on the internet and world wide web (WWW), and manufacturers' literature, current search engines are designed to locate and categorize ideas that are already there and well established. No engines are designed to automatically search the web and detect new ideas as they emerge. Furthermore there are no search engines which detect the spread of a new idea and automatically detect the transition of a new idea from its faddish stage which is usually exploitable only by its originator to its category stage in which it is exploitable by a variety of other related and unrelated businesses.

Another difficulty which precludes the use of current search engines for new idea detection is that existing search engines do not differentiate between new ideas and new documents. There is so much data created within a domain, that even if a search engine were to detect all new documents within a domain, a knowledgeable reader must spend inordinate amounts of time reading and analyzing the documents in order to detect truly new and novel ideas which are relatively few and far between. It is also possible that a knowledgeable reader may be scanning documents and miss a new idea because it is indexed incorrectly, or the wrong keywords do not attract his attention. There is a need for a system which doggedly pursues all documents within a domain and detects new ideas within those documents.

While this concept was initially developed for business management, the technique is equally applicable to searching any domain of endeavor or field of study to detect when new ideas occur. The technique can be applied to any field in which there is communication between individuals because a necessary and fundamental reason why this lexicon-based approach works is that new ideas, of necessity, require a label else the idea cannot be effectively communicated. Law enforcement and intelligence collection is currently unable to have human operators analyze all documents and communications that it has collected and therefore has a need to automatically process many documents in order to extract those documents which should be analyzed in detail by human operators. This lexicon-based approach can detect the introduction of new ideas into the communications between individuals whose conversations or mails are being monitored.

BRIEF SUMMARY OF THE INVENTION

The object of this invention is to enable a user to automatically search a set of documents, database, or other symbolic representations of ideas in order to detect the occurrence of new ideas in another set of documents or symbolic representations. It is a method and apparatus for detecting the occurrence of new ideas in documents. The method is comprised of three processes. The first process lexiconizes all words and symbols in a first set of documents. The second process compares all words in a second set of documents to the words in the lexicon. Words not already in the lexicon are presented to a user who takes one of two courses of action, 1) lexiconizes the word, or, 2) declares it a "fad" indicating that the word is to be further analyzed. The third process measures the spatial and temporal spread of said fad by searching a third set of documents. Metrics are computing on additional occurrences of said fad in the third set of documents. A fad is deemed to have achieved a level of interest denoted as a category based on said metrics exceeding some threshold. When a category is detected, a user is notified.

The basic premise on which this invention relies is that ideas are communicated by words or other symbolic representation of the idea (hereinafter referred to simply as words). Within a particular domain of endeavor or field of study (hereinafter simply referred to as domain) there is a particular set of words, which is a subset of the set of all words, which encompasses all of the ideas expressible within that domain. People communicate ideas through the use of words. When a new idea is discovered or invented, a new word or sequence of words is developed to describe it and differentiate it from other ideas. This new word can be discovered as soon as it is first used by comparing all new or modified documents or collections of symbols in a domain with a lexicon of all existing words used within that domain. If a new word is found in these new or modified documents there are two possibilities. The first is that the word does not represent a new idea and that it wasn't lexiconized during the initialization process of developing the lexicon associated with a domain. This word can then be added to the lexicon to create an augmented lexicon and it will not be detected again since it is now part of the lexicon of that domain. The second possibility is that the word has at least to a user the appearance of representing an idea which is new to the domain. In this second case, additional analysis can be performed to characterize its evanescence.

Other advantages and features of the invention will become apparent from the following detailed description of the preferred embodiments of the various processes and the accompanying drawings.

BRIEF DESCRIPTION OF THE SEVERAL VIEWS OF THE DRAWING

The drawings referenced here are included to assist one skilled in the art of computer programming and search engine design to understand the detailed computer code which is on the accompanying CDROM Appendix. Common structures and programming conventions are not included because of the multiplicity of ways in which they can be implemented. No physical drawings are included as the particulars of the computational device and the programming language or hardware description language used to implement the processes are irrelevant. The actual, functional software which implemented the method and apparatus is included on the CDROM as an actual reduction to process. The invention will now be described with reference to certain preferred embodiments thereof and the accompanying drawings, wherein:

Dwg. 1 is a block diagram of the various processes and their relationship in the two computers as well as the programming language in which they are implemented;

Dwg. 2 is a flow chart of the fad and category detection process;

Dwg. 3 is a finite state machine which describes the sequence of steps used to obtain documents from web sites;

Dwg. 4 is a finite state machine which describes the sequence of steps to obtain all documents from a web site;

Dwg. 5 is a finite state machine which describes the sequence of steps used to obtain only documents which have changed on a web site;

Dwg. 6 is a finite state machine which describes the sequence of steps used to detect a fad which is comprised of a single word;

Dwg. 7 is a finite state machine which describes the sequence of steps used to detect a fad which is comprised of a sequence of two words; and, Dwg. 8 is a finite state machine which describes the sequence of steps used to declare a fad a category.

DETAILED DESCRIPTION OF THE INVENTION

In a preferred embodiment, the apparatus includes a means for detecting new ideas in a domain of endeavor or field of study by comparing existing words as stored in a lexicon which is developed from a domain of interest, and analyzing the spread of these new words within the domain as they are used in new or edited documents. While the actual reduction to practice consists of a system to search the internet and detect new ideas, its use is not limited to textual information in internet documents. The methodology can be applied to any means of storage or transmission of symbolic information which relates to ideas or things. There is no intent to limit this concept to single word or symbol occurrences as sequences of words can also be stored in a lexicon with which new document contents can be compared.

For the purpose of the following narrative, the actual reduction to practice of the method will be referred to as FadCat, an abbreviation for fad and category detection which represents the two distinct but complementary phases of the new idea detection and identification process.

Drawing 1 illustrates the major component processes and their relationships. A user interface 1 implemented in a web browser format provides a means for the user to interact with the system. A database and associated query processing system 2 provides the storage of and access to lexicons and other data tables. A document access and analysis system 3 accesses the internet to retrieve documents and interacts with the database system 2 to detect fads. A second document access and analysis system 4 accesses the internet to retrieve documents and interacts with the database system 2 to determine when a category occurs.

Drawing 2 illustrates a flowchart which documents the several processes that comprise the method and apparatus. A user interacts with FadCat through a web browser interface 1 to enter one or more URLs associated with a domain. Additional parameters such as the depth and breadth of the search or multiple URLs can also be entered in 1. The depth of search within that web site is defined as the number of subdirectories from which the system automatically reads data in order to generate the initial lexicon. The breadth of search refers to the distance in cyberspace from the original URL as measured by the number of hyperlinks which are followed to different internet protocol (IP) addresses which are found through searching the directory structure to the specified depth at each IP address.

A first process 2 in Drawing 2, called bootstrapping, develops the original lexicon with which all subsequent document contents are compared. This lexicon may later be augmented as a result of 6 and used in subsequent comparisons. The term lexicon is used because it is the vocabulary of a domain with no syntactic or semantic meaning associated with individual words being required. The mere existence of a word in a domain is sufficient to identify the existence of an idea within that domain and the introduction of a non-domain word, neologism, acronym, or abbreviation into the vocabulary is indicative of a new or evolving idea. Drawings 3 and 4 illustrate finite state machines which describe the sequence of steps used to obtain documents from web sites.

Once the lexicon for a domain is bootstrapped in 2 of Drawing 2, a second process, called fad detection, is begun. Without loss of generality, the process will be described for the detection of a single fad word; however, this process has been parallelized such that multiple searches are implemented simultaneously. Fad detection is represented by Drawing 2, items 3 through 7. At regular intervals under computer program control, documents at all of the IP addresses previously found for this domain are examined. If documents which have not been lexicenized are found, the process generates a second collection of words, most typically in the form of a textual document, and compares in Drawing 2, item 4 all words in this document with the possibly augmented bootstrap lexicon. This process is simplified if the directory structure of the machine being read allows for determination of the date the file was last stored. Drawing 5 illustrates a finite state machine which describes the sequence of steps used to obtain only documents which have changed on a web site.

If a word is detected, that is, it is found not to be in the lexicon, then this word is declared a fad. Drawing 6 illustrates a finite state machine which describes the sequence of steps used to detect a fad which is comprised of a single word. Drawing 7 illustrates a similar process for the detection of sequences of two words. Fads are stored along with their associated fiducial information and context such that meaningful metrics can be computed and the user can easily access the data in which the fad word was found. Once a fad is detected, a human operator is notified in Drawing 2 item 5 so that the user can determine whether the fad word is to be lexicenized in Drawing 2 item 7 or passed to the category detection process Drawing 2, items 8 through 11.

If the user chooses in Drawing 2 item 6 to continue the acquisition of data about the fad word for category analysis, rather than add it to the existing domain-specific lexicon in Drawing 2 item 7, a categorization process is begun. This process Drawing 2 items 8 through 11 is referred to as category detection. Drawing 8 illustrates a finite state machine which describes the sequence of steps used to declare a fad to be a category. Category detection acquires data in Drawing 2 item 8 from one or more third collections of words such as a document in order to find additional occurrences of the fad word which is now under consideration. For each new occurrence of a previously declared fad word, its associated fiducial data are collected and stored. Fiducial data include the date and time of the document, the URL, the context (i.e., the fad word along with its surrounding words) and other data which can be used to measure the spread of the idea or its actual meaning in Drawing 2 item 9. A variety of metrics can be calculated in Drawing 2 item 9 from the data which are acquired about the fad word.

While the category detection process is acquiring data about new occurrences of the fad word in Drawing 2 item 8, it is also processing the fiducial data obtained as a result of its search in Drawing 2 item 9. Metrics which are indicative of spatial or temporal spread of fads are computed utilizing the fiducial data associated with occurrences of fads in the said third collection. If a metric exceeds a user-set threshold, then the user is notified that a fad word has been categorized. In this embodiment, a geographic method was used which characterizes the transition from a fad to a category based on the geographic distance over which the fad word was detected. This distance is computed using data obtained from internet web sites which associate a URL with its geographic location. The geographic location of the site of the first detection of a fad word is used as a first point from which the distance to the site of each new detection of a fad is computed. Great circle distance is the distance metric computed here, but any other metric meeting the requirements of a mathematical norm can be used. Other metrics could be the temporal rate of increase of the usage of the fad word, the number of documents which contain the word, the number of URLs that contain a document with the fad word, or similar measure of diffusion. Different metrics are used by different users and are particular to their interest in the categorization process.

If a threshold is exceeded by the metric in Drawing 2 item 10, the user is notified through the user interface of Drawing 1 item 1. Until a category is declared by a threshold exceedence, Drawing 2 item 8 continues to automatically search for and acquire new documents and detect the presence of the fad word under consideration.

The method and apparatus were implemented using various software programs and two separate computers operating under different operating systems. Communications between the computers and the several processes occurred both internal to each computer and through normal internet protocol communications. This implementation is in no way restrictive as the method could be implemented by one skilled in the art in various forms of local or distributed processing and over various communications links. Two forms of documentation of the actual reduction to practice are provided. The first is a set of finite state machine diagrams which documents the manner in which the method can be implemented. This is computer language independent and was used as an intermediate method for formally defining the algorithm such that a computer programmer skilled in the art could implement it. It is the documentation from which the software was originally developed, and as such, no further documentation other than the code itself will be provided for the implementation of the processes.

Referring again to Drawing 1, two major software packages were used to create this embodiment. Macromedia ColdFusion internet application development software was used to develop the user interfaces Drawing 1 item 1 in a web-browser environment. This software is used as it is capable of transforming the user interaction with the browser into structured queries that can be passed to the back-end data engines. The data engine of Drawing 1 item 2 is implemented in the Microsoft SQL Server database environment.

Two operating systems are used for this implementation but are not required in general. The Microsoft Windows 2000 Server operating system implements Drawing 1 items 1 and 2. The RedHat Linux 6.2 operating system implements the Java computer programming language programs of Drawing 1 items 3 and 4. The particular operating systems are generic and the entire system could be implemented in either or any of the variety of different Microsoft Windows operating systems or any of the various implementations of the Linux or other operating system. When FadCat was originally implemented on a computer running the Microsoft Windows 2000 Server operating system, the method suffered from severe limitations of the Microsoft Windows operating system hence it was distributed between two computers and two operating systems. The FadCat method is independent of the operating system and these two systems were chosen for reasons unrelated to its function.

Three languages are used to implement FadCat, however this is not to say that other suitable languages could not be substituted for them. ColdFusion's internet application development software extension to the hypertext markup language allows issuing structured query language commands to the data base as the means of communications between Drawing 1 items 1 and 2. The second language is the Microsoft SQL Server database language SQL-7 itself for querying the database. SQL-7 queries are passed via the internet from the Java computer programming language programs of Drawing 1, items 3 and 4 on the Linux operating system platform to the Microsoft SQL-7 database of Drawing 1 item 2. The third programming language is the JAVA computer programming language, a platform independent language that was used for accessing the internet and web sites and acquiring and processing data. The JAVA language is used to implement the processes of Drawing 1 items 2 and 3 on the Linux operating system platform.

The invention has been described with reference to certain preferred embodiments thereof. It will be understood, however, that modification and variations are possible within the scope of the appended claims.

What I claim as my invention is:

1. A computer-implemented method for detecting new ideas within symbolic representations pertaining to a domain of endeavor, comprising:
   accessing the symbolic representations pertaining to the domain of endeavor to detect a symbol contained within the symbolic representations that had been previously identified as not being found within a base lexicon of symbols associated with the domain of endeavor;
   retrieving a symbol from the symbolic representations;
   searching a base lexicon of symbols associated with the domain of endeavor for an instance of the symbol;
   if the instance of the symbol is not found in the base lexicon of symbols associated with the domain of endeavor, then performing the steps of:
      presenting the symbol to a user as a new symbol;
      receiving input from the user indicative of whether the new symbol should be tracked;
      if the input received from the user indicates that the new symbol should not be tracked, then adding the symbol to the base lexicon of symbols associated with the domain of endeavor; and
      if the input received from the user indicates that the new symbol should be tracked, then performing the steps of:
         accumulating data indicative of a spread of multiple instances of the symbol throughout the domain of endeavor;
         determining whether the spread of multiple instances of the symbol throughout the domain of endeavor exceeds a threshold; and
         if the spread of multiple instances of the symbol throughout the domain of endeavor exceeds a threshold, then outputting an indication based on the symbol to a user that a new idea within the domain of endeavor has been detected.

2. A method according to claim 1, wherein the symbol includes a word, a neologism, an acronym, an abbreviation, or a string of words with a separator.

3. A method according to claim 1, wherein the symbolic representations pertaining to the domain of endeavor include contents of an internet web site reachable within a specified number of indirections from an Internet Protocol (IP) address, contents of transcripts of verbal communications, or electronic representations of written communications.

4. A method according to claim 1, further comprising:
   initializing the base lexicon of symbols associated with the domain of endeavor based on symbols contained within the symbolic representations pertaining to the domain of endeavor.

5. A method according to claim 1, further comprising:
   receiving input from a user defining the threshold.

6. A method according to claim 1, wherein said accumulating the data indicative of the spread of multiple instances of the symbol throughout the domain of endeavor includes:
   accumulating a date or time of a document containing the symbol, a Uniform Resource Locator (URL) of a document containing the symbol, or a context of the symbol.

7. A method according to claim 6, further comprising:
   calculating the spread of multiple instances of the symbol based on respective dates or times of documents containing the symbol, respective Uniform Resource Locators (URLs) of document containing the symbol, or respective contexts of the symbol.

8. A method according to claim 1, further comprising:
   receiving input from a user identifying the symbol to be detected.

9. A computer-readable medium bearing instructions for detecting new ideas within symbolic representations pertaining to a domain of endeavor, said instructions, when executed, arrange to cause a computer to perform the steps of:

accessing the symbolic representations pertaining to the domain of endeavor to detect a symbol contained within the symbolic representations that had been previously identified as not being found within a base lexicon of symbols associated with the domain of endeavor;

retrieving a symbol from the symbolic representations;

searching a base lexicon of symbols associated with the domain of endeavor for an instance of the symbol;

if the instance of the symbol is not found in the base lexicon of symbols associated with the domain of endeavor, then performing the steps of:

presenting the symbol to a user as a new symbol;

receiving input from the user indicative of whether the new symbol should be tracked;

if the input received from the user indicates that the new symbol should not be tracked, then adding the symbol to the base lexicon of symbols associated with the domain of endeavor; and if the input received from the user indicates that the new symbol should be tracked, then performing the steps of:

accumulating data indicative of a spread of multiple instances of the symbol throughout the domain of endeavor;

determining whether the spread of multiple instances of the symbol throughout the domain of endeavor exceeds a threshold; and if the spread of multiple instances of the symbol throughout the domain of endeavor exceeds a threshold, then outputting an indication based on the symbol to a user that a new idea within the domain of endeavor has been detected.

10. A computer-readable medium according to claim 9, wherein the symbol includes a word, a neologism, an acronym, an abbreviation, or a string of words with a separator.

11. A computer-readable medium according to claim 9, wherein the symbolic representations pertaining to the domain of endeavor include contents of an internet web site reachable within a specified number of indirections from an Internet Protocol (IP) address, contents of transcripts of verbal communications, or electronic representations of written communications.

12. A computer-readable medium according to claim 9, wherein said instructions are further arranged to cause the computer to perform the steps of:

initializing the base lexicon of symbols associated with the domain of endeavor based on symbols contained within the symbolic representations pertaining to the domain of endeavor.

13. A computer-readable medium according to claim 9, wherein said instructions are further arranged to cause the computer to perform the steps of:

receiving input from a user defining the threshold.

14. A computer-readable medium according to claim 9, wherein said accumulating the data indicative of the spread of multiple instances of the symbol throughout the domain of endeavor includes:

accumulating a date or time of a document containing the symbol, a Uniform Resource Locator (URL) of a document containing the symbol, or a context of the symbol.

15. A computer-readable medium according to claim 14, wherein said instructions are further arranged to cause the computer to perform the steps of:

calculating the spread of multiple instances of the symbol based on respective dates or times of documents containing the symbol, respective Uniform Resource Locators (URLs) of document containing the symbol, or respective contexts of the symbol.

16. A computer-readable medium according to claim 9, wherein said instructions are further arranged to cause the computer to perform the steps of:

receiving input from a user identifying the symbol to be detected.

17. A computer-implemented method for detecting new ideas within symbolic representations pertaining to a domain of endeavor, comprising:

accessing the symbolic representations pertaining to the domain of endeavor, wherein the symbolic representations pertaining to the domain of endeavor include contents of an internet web site reachable within a specified number of indirections from an Internet Protocol (IP) address, contents of transcripts of verbal communications, or electronic representations of written communications;

retrieving a symbol from the symbolic representations; wherein the symbol includes a word, a neologism, an acronym, an abbreviation, or a string of words with a separator;

searching a base lexicon of symbols associated with the domain of endeavor for an instance of the symbol;

if the instance of the symbol is not found in the base lexicon of symbols associated with the domain of endeavor, then performing the steps of:

presenting the symbol to a user as a new symbol;

receiving input from the user indicative of whether the new symbol should be tracked;

if the input received from the user indicates that the new symbol should not be tracked, then adding the symbol to the base lexicon of symbols associated with the domain of endeavor; and if the input received from the user indicates that the new symbol should be tracked, then performing the steps of:

accumulating data indicative of a spread of multiple instances of the symbol throughout the domain of endeavor;

determining whether the spread of multiple instances of the symbol throughout the domain of endeavor exceeds a threshold; and if the spread of multiple instances of the symbol throughout the domain of endeavor exceeds a threshold, then outputting an indication based on the symbol to a user that a new idea within the domain of endeavor has been detected.

18. A computer-readable medium bearing instructions for detecting new ideas within symbolic representations pertaining to a domain of endeavor, said instructions, when executed, arranged to cause a computer to perform the steps of the method according to claim 17.

* * * * *